United States Patent [19]

Nowobilski et al.

[11] Patent Number: 4,537,820

[45] Date of Patent: Aug. 27, 1985

[54] INSULATION BOARD AND PROCESS OF MAKING

[75] Inventors: Jeffert J. Nowobilski, Orchard Park; William J. Owens, Kenmore, both of N.Y.

[73] Assignee: Union Carbide Corporation, Danbury, Conn.

[21] Appl. No.: 547,669

[22] Filed: Nov. 1, 1983

[51] Int. Cl.³ .............................................. B32B 15/00
[52] U.S. Cl. .................................. 428/285; 156/62.8; 156/155; 156/299; 156/311; 156/324; 264/136; 264/137; 264/258; 428/288; 428/297; 428/298; 428/302; 428/426; 428/902; 428/903; 428/920
[58] Field of Search ............... 428/280, 282, 285, 296, 428/297, 298, 299, 300, 426, 251, 920, 902, 903, 302; 156/62.8, 299, 155, 311, 324; 264/136, 137, 258

[56] References Cited

U.S. PATENT DOCUMENTS

| | | | |
|---|---|---|---|
| 2,745,173 | 5/1956 | Janos | 29/455 |
| 2,765,587 | 10/1956 | Skerritt | 156/62.8 |
| 3,199,715 | 8/1965 | Paivanas | 220/9 |
| 3,289,423 | 12/1966 | Berner et al. | 62/45 |
| 4,447,490 | 5/1984 | Ventker et al. | 428/920 |

Primary Examiner—James J. Bell
Attorney, Agent, or Firm—Stanley Ktorides

[57] ABSTRACT

Insulation board capable of bearing a load without significant loss of insulating capacity due to compression, produced by a method wherein the board is made in compliance with specified conditions of time, temperature and pressure.

19 Claims, 2 Drawing Figures

INSULATION BOARD AND PROCESS OF MAKING

The Government has rights in this invention pursuant to Contract No. DE-AC02-80ET25426 awarded by the U.S. Department of Energy.

TECHNICAL FIELD

This invention relates to thermal insulation board and more particularly to thermal insulation board capable of bearing a load.

BACKGROUND ART

Load bearing thermal insulation is employed in a number of applications where heat transfer resistance and load bearing capability are required. One such application is evacuated panel enclosures for high temperature batteries. In such applications the insulation must not only have good heat transfer resistance but must also have high compressive strength. A good load bearing insulation compresses very little under load. Unfortunately, conventional materials having the qualities which impart to a material good compressive strength, such as rigidity and hardness, also have poor resistance to heat transfer.

Glass is one material that exhibits both heat transfer resistance and compressive strength. Thermal insulation board has been constructed by stacking layers of glass fiber sheets and adhering them together to form a board of desired thickness. This board can then be cut to fit the configuration of the volume sought to be insulated.

One such known method comprises stacking glass fiber layers held together with a binder or adhesive. Although such a method is relatively simple and inexpensive, the resulting thermal insulation board is inadequate for many types of uses. One reason is that the chemical binder or adhesive between the glass fiber layers provides a conductive pathway for heat to travel through the insulation. Another reason, which arises in a high temperature evacuated panel enclosure, such as a high temperature battery box, is that at such high temperatures, the chemical binder or adhesive breaks down and releases gases which degrade the vacuum resulting in reduced insulation.

Another known method of producing thermal insulation board is disclosed in U.S. Pat. No. 2,745,173—Janos. This method requires compressing a stack of glass fiber layers with a force of at least one atmosphere and preferably greater, and then heating the compressed stack to a temperature above the glass strain temperature but below the glass annealing temperature. Such a process produces good thermal insulation board without the need for chemical binders or adhesives. However insulation board made by this process is inadequate for certain high performance applications. It is believed that the performance of the insulation board produced by this process is compromised because the process causes stresses in the board so that cracks are formed in the compressed boards. This is especially the case in larger boards. Furthermore, this method may cause breakage of some of the glass fibers so that they may become oriented perpendicular to the other fibers and parallel to the heat leak. This reduces the integrity of the insulation board. The relatively large compressive force is believed to increase fiber to fiber contact increasing conductivity and reducing heat transfer resistance of the insulation board.

It is therefore an object of this invention to provide a thermal insulation board which exhibits improved insulation and good compressive strength without use of chemical binders or adhesives.

It is another object of this invention to provide a thermal insulation board which exhibits improved insulation and good compressive strength wherein glass fiber breakage and fiber to fiber contact is minimized.

It is a further object of this invention to provide a method of making thermal insulation board which achieves the objects specified above.

SUMMARY OF THE INVENTION

The above and other objects which will become apparent to one skilled in the art upon a reading of this disclosure are attained by this invention one aspect of which is:

Insulation board having a density less than 30 pounds per cubic foot and capable of bearing a load, produced by a process comprising:

(a) providing a stack of substantially binderless glass fiber sheets in an amount sufficient to achieve insulation board of desired density less than 30 pounds per cubic foot;

(b) providing a press to compress the stack;

(c) heating the stack and the press to a temperature in the range of from the glass strain temperature to less than the glass softening temperature for a time period sufficient to achieve thermal equilibration of the stack and the press surface;

(d) thereafter compressing the stack by applying a light vertically compressive force of from 0.2 to 5.0 pounds per square inch to the stack for a time period sufficient to produce insulation board of desired density and to substantially relieve stress within the board; and (e) cooling the compressed glass fiber stack to ambient temperature.

Another aspect of this invention is:

A process for producing insulation board having a density of less than 30 pounds per cubic foot and capable of bearing a load comprising:

(a) providing a stack of substantially binderless glass fiber sheets in an amount sufficient to achieve insulation board of desired density less than 30 pounds per cubic foot;

(b) providing a press to compress the stack;

(c) heating the stack and the press to a temperature in the range of from the glass strain temperature to less than the glass softening temperature for a time period sufficient to achieve thermal equilibration of the stack and the press surface;

(d) thereafter compressing the stack by applying a light vertically compressive force of from 0.2 to 5.0 pounds per square inch to the stack for a time period sufficient to produce insulation board of desired density and to substantially relieve stress within the board; and (e) cooling the compressed glass fiber stack to ambient temperature.

As used herein the term "vertically compressive force" means a force vertical with respect to the stack. Although the stack will generally be oriented vertically with respect to the horizontal ground surface this is not absolutely necessary and the stack may be oriented at any angle to the horizontal.

As used herein the term "press" means any means which can impart a compressive force to the glass fiber stack.

As used herein the term "press surface" means that portion of the press that is intended to contact the stack.

As used herein the term "glass strain temperature" means the temperature at which the glass internal stress is reduced to a commercially acceptable value in about 4 hours. This point corresponds to a glass viscosity of $10^{14.5}$ poises when measured by ASTM No. C336 or C598.

As used herein the term "glass annealing temperature" means the temperature at which the glass internal stress is reduced to a commercially acceptable value in about 15 minutes. This point corresponds to a glass viscosity $10^{13}$ poises when measured by ASTM No. C336 or C598.

As used herein the term "glass softening temperature" is the temperature at which a uniform glass fiber, 0.55 to 0.75 millimeters in diameter and 23.5 centimeters long, elongates under its own weight when the upper 10 centimeters is heated in the manner prescribed by ASTM No. C338.

As used herein the term "thermal equilibration" means that state when the temperature of all points within a body are within ten percent of the mean temperature of that body.

DETAILED DESCRIPTION

Figure 1:
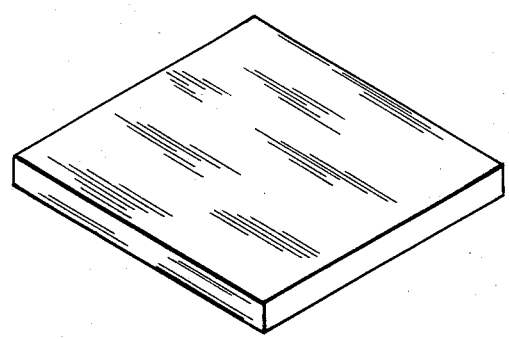
FIG. 1 is a drawing of a typical embodiment of the insulation board of this invention.

Glass fiber sheets useful in this invention are well known and commercially available. The sheets are typically made up of criss-crossing glass fibers which are in the same plane. A sheet may be made up of several layers of such glass fibers. One commercial designation for such sheets is Manniglas 1400 produced by Manning Paper Company.

The diameter of the glass fibers which make up these glass fiber sheets can be from 0.2 to 13 microns and preferably is from 1 to 5 microns. The glass fiber sheets may also contain an opacifier such as titanium dioxide powder which serves to reduce radiative heat transfer through the glass fiber sheet.

The glass fiber sheets also generally contain a binder to hold the individual fibers together for ease of handling. The binder may be a common commercial adhesive and is usually polyvinyl alcohol (PVA). It is important that this binder material be essentially completely removed from the glass fiber sheets for the attainment of the maximum benefits of this invention. The binder material, if present, may be removed prior to or during the process of this invention. One way of removing the binder material from the glass fiber sheets is to heat the sheets at a temperature equal to or up to 400° F. less than the glass strain temperature for a time sufficient to take out essentially all of the binder material in the glass fiber sheets. For most conventional commercially available glass fiber sheets which contain binder material, such a procedure takes from 2 to 16 hours and generally takes about 4 hours.

The glass fiber sheets are stacked in an amount sufficient to achieve a thermal insulation board of desired density less than 30 pounds per cubic foot. The desired density will vary and will depend upon the weight or load that one anticipates the insulation board will be required to support. Generally the insulation board of this invention will have a density of from 14 to less than 30 pounds per cubic foot (pcf). An especially useful application of this invention is as an enclosure for a high temperature battery, such as may be used in an electrically powered vehicle. The insides of the double-walled panels which make up such enclosure are evacuated and therefore the load on the outside surface of the enclosure is atmospheric pressure or about 15 pounds per square inch (psi) (1.03 kgm/cm$^2$). It has been found that insulation board of this invention having density of 18 pcf will result in less than 10 percent compression under atmospheric load.

The press which is useful in the process of this invention is any device which can impart a compressive force vertically to the stack of glass fiber sheets. The press can be quite simple such as a weight placed upon the stack, or it may be more complicated such as a mechanical or electro-mechanical device for imparting pressure.

It is important to the successful practice of this invention that the stack of glass fiber sheets be in thermal equilibrium with at least the surface of the press when the light vertically compressive force is applied and that such thermal equilibrium be at a temperature in the range of from the glass strain temperature to less than the glass softening temperature. Such thermal equilibrium can be achieved by placing the stack in the press and heating them together, or by heating the press and the stack separately, for some or all of the time required to reach the desired compressing temperature within the defined range, before bringing them together. The binder removal step may conveniently be done during the heating step wherein the stack of glass fiber sheets is brought from ambient temperature to the desired compressing temperature.

As mentioned above, the temperature at which the stack and compressing means are in thermal equilibrium when the light vertically compressive force is applied is from the glass strain temperature to less than the glass softening temperature. Preferably this desired compressing temperature is from 100° F. above the glass strain temperature to not greater than 200° F. below the glass softening temperature. A particularly preferred compressing temperature is at about the glass annealing temperature. Thermal equilibrium of the stack and the press during compression at a temperature at least at the lower defined limit is important. In this way, shear stresses due to differential thermal expansion do not form, so cracks in the finished board are not likely to form. The upper temperature limit is also important in minimizing the finished board thermal conductivity. Deformation of the glass fibers resulting in increased fiber to fiber contact area will occur when the temperature exceeds the glass softening temperature. It is necessary only that the press surface be in thermal equilibrium with the stack though, of course, it is possible that the entire press be in such thermal equilibrium.

When the stack and the compressing means are in thermal equilibrium at the desired compressing temperature, a light vertically compressive force of form 0.2 to 5.0 psi, preferably from 0.5 to 1.5 psi, is applied to the stack by the press. Only this light compressive force is required because the glass fibers are heated to near their strain temperature before they are compressed. The compressive force which does not exceed 5.0 psi and preferably does not exceed 1.5 psi is considerably smaller than that heretofore employed and taught for the compression of glass sheets. As a result of the use of the light compressive force taught herein, fewer glass fibers are damaged or broken. Broken fibers tend to stick up or orient themselves at right angles to the rest of the fibers, resulting in increased thermal conductivity. This is because the thermal insulation board achieves maximum insulation when the glass fibers are oriented perpendicular to the direction of heat leak. Any broken fibers which are perpendicular to the bulk of the other fibers would serve as a heat conduction pathway and thus lessen the effectiveness of the insulation board. The light compressive force is also more conducive to maintaining only point contact between fibers.

The process of this invention with the specified light compressive force at the specified temperature results in an insulation board which is capable of bearing a load and which has a maximum of glass fibers which can be oriented perpendicular to the direction of heat leak and thus maximizes the thermal resistance of the board.

The glass fiber stack is heated under the specified light compressive force for a time period which enables one to compress the stack to attain an insulation board of the desired density and also allow the compressed glass fiber stack to have a generally uniform temperature so as to relieve the stresses caused by compression to the desired density. This time period can be from 2 to 16 hours and generally is about 4 hours.

When the desired density and requisite temperature uniformity are attained the stack is cooled to ambient temperature. The rate of cooling is not of particular importance, although very rapid cooling, such as by quenching, might cause damage to the board from thermal shock. The stack may be cooled within or removed from the press. The board may be cut or otherwise shaped to conform to the space which one desires to insulate.

The process of this invention may be carried out in batch or continuously in a continuous feed oven.

The following example serves to further illustrate the invention. It is offered for illustrative purposes and is not intended to limit the invention.

EXAMPLE 1

Glass fiber sheets (Manniglas 1400 available from Manning Paper Co.) having glass fibers of 3 micron diameter were layered into a stack. The stack was 4 inches high and was made up of approximately 250 glass fiber sheets. The press comprised upper and lower stainless steel press plates with the upper press plate supported by aluminum fuse blocks which melted and collapsed at elevated temperature thus lowering the upper press plate to impart the light compressive force. The glass strain temperature of the type of glass used in this example is 950° F. and the softening temperature is 1550° F.

The glass fiber stack was heated at 900° F. for four hours to bake out the PVA binder which comprised about 7 percent of the glass fiber sheets. The stack and press were heated together to thermal equilibrium at a temperature of 1300° F. At this temperature and while the stack and press were in thermal equilibrium a light vertical compressive force of 0.9 psi was applied to the stack by the press for about 6 hours during which time the stack and press were kept within the defined temperature range. The compressed stack was then cooled at ambient temperature for about 8 hours and the resulting insulation board was removed from the press. FIG. 1 is a generalized representation of the insulation board of this Example 1 when removed from the press.

The density of the insulation board produced was 20.5 pcf. The compression of the board at atmospheric loading was only 13 percent. The insulating qualities of the board were tested by applying at temperature of 850° F. on one side of the board and ambient temperature of 70° F. on the other side. The thermal conductivity of the board was only $151 \times 10^{-5}$ BTU/hr. ft. °F.

The above example is of a batch-type process. In a continuous process, such as in a continuous feed oven, the preferred method of carrying out the process of the invention would entail preheating and keeping a number of presses in the oven at the desired compressing temperature, loading a stack of glass fiber sheets into a press at one point of the continuous oven, bringing the stack up to the temperature of the press and into thermal equilibrium with it, and then compressing the stack by applying the light vertically compressive force.

Figure 2:
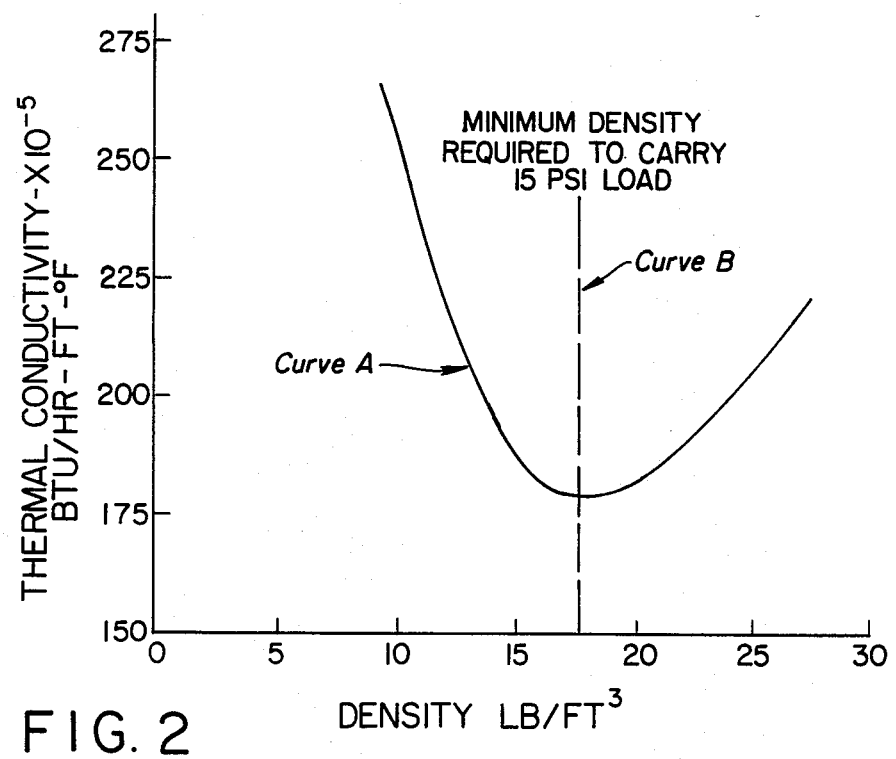
FIG. 2 is a graphical representation of thermal conductivity versus density for thermal insulation board produced from glass fibers of 3 micron diameter.

When the insulation board of the present invention is used in a load-bearing application, a minimum board density is required to carry the load without excessive compression. Also, for a specific fiber diameter, the thermal conductivity of the board varies with board density. A density optimization may be made to achieve minimum thermal conductivity with adequate load-bearing capability. An example of such an optimization is illustrated in FIG. 2. Curve A shows the variation in thermal conductivity with density for a board made of 3 micron diameter fibers. Curve B indicates the minimum density required to carry a 15 psi load with less than a 10 percent compression, i.e., decrease in board thickness. Curves such as those of FIG. 2 depend on the operating temperature difference and the amount of compression allowed. For example, when the temperature difference is from cryogenic to ambient, minimal thermal conductivity occurs at 10.3 pcf, while 15 pcf is still needed to achieve only 10 percent compression. Thus, in FIG. 2, the intersection of Curve B with Curve A at its minimum is coincidental.

By use of the process and resulting product of this invention one can now provide a thermal insulation board capable of bearing a load without loss of excellent insulating capability. Depending on the load anticipated one can achieve the desired board density by choice of fiber diameter and processing conditions of temperature, pressure and time. Although the invention has been described in detail with reference to a specific embodiment, it is recognized that there are many other embodiments within the scope of the claims.

We claim:
1. Insulation board having a density less than 30 pounds per cubic foot and capable of bearing a load, produced by a process comprising:
   (a) providing a stack of substantially binderless glass fiber sheets in an amount sufficient to achieve insulation board of desired density less than 30 pounds per cubic foot;
   (b) providing a press to compress the stack;
   (c) heating the stack and the press to a temperature in the range of from the glass strain temperature to less than the glass softening temperature for a time period sufficient to achieve thermal equilibration of the stack and the press surface;
   (d) thereafter compressing the stack by applying a light vertically compressive force of from 0.2 to 5.0 pounds per square inch to the stack with the press, at said thermal equilibrium for a time period suffi- cient to produce insulation board of desired density and to substantially relieve stress within the board; and (e) cooling the compressed glass fiber stack to ambient temperature.

2. Insulation board having a density less than 30 pounds per cubic foot and capable of bearing a load, produced by a process comprising:

(a) heating binder-containing glass fiber sheets at a temperature in the range of from equal to, to 400° F. below, the glass strain temperature for a time period sufficient to remove essentially all of the binder material in the glass fiber sheets and providing a stack of said binderless glass fiber sheets in an amount sufficient to achieve insulation board of desired density less than 30 pounds per cubic foot;

(b) providing a press to compress the stack;

(c) heating the stack and the press to a temperature in the range of from the glass strain temperature to less than the glass softening temperature for a time period sufficient to achieve thermal equilibration of the stack and the press surface;

(d) thereafter compressing the stack by applying a light vertically compressive force of from 0.2 to 5.0 pounds per square inch to the stack with the press, at said thermal equilibrium for a time period sufficient to produce insulation board of desired density and to substantially relieve stress within the board; and (e) cooling the compressed glass fiber stack to ambient temperature.

3. The insulation board of claims 1 or 2 having a density of from 14 to less than 30 pounds per cubic foot.

4. The insulation board of claims 1 or 2 wherein step (c) is accomplished by heating the stack and the press together.

5. The insulation board of claims 1 or 2 wherein a part of step (c) is accomplished by heating the stack and the press separately.

6. The insulation board of claims 1 or 2 wherein the temperature range of step (c) is from 100° F. greater than the strain temperature to 200° F. below the glass softening temperature.

7. The insulation board of claims 1 or 2 wherein the light vertically compressive force is from 0.5 to 1.5 pounds per square inch.

8. The insulation board of claims 1 or 2 wherein the time period of step (d) is from 2 to 16 hours.

9. The insulation board of claims 1 or 2 wherein the glass fiber sheets are comprised of glass fibers having a diameter of from 0.2 to 13 microns.

10. A process for producing insulation board having a density of less than 30 pounds per cubic foot and capable of bearing a load comprising:

(a) providing a stack of substantially binderless glass fiber sheets in an amount sufficient to achieve insulation board of desired density less than 30 pounds per cubic foot;

(b) providing a press to compress the stack;

(c) heating the stack and the press to a temperature in the range of from the glass strain temperature to less than the glass softening temperature for a time period sufficient to achieve thermal equilibration of the stack and the press surface;

(d) thereafter compressing the stack by applying a light vertically compressive force of from 0.2 to 5.0 pounds per square inch to the stack with the press, at said thermal equilibrium for a time period sufficient to produce insulation board of desired density and to substantially relieve stress within the board; and (e) cooling the compressed glass fiber stack to ambient temperature.

11. A process for producing insulation board having a density of less than 30 pounds per cubic foot and capable of bearing a load comprising:

(a) heat binder-containing glass fiber sheets at a temperature in the range of from equal to, to 400° F. below, the glass strain temperature for a time period sufficient to remove essentially all of the binder material in the glass fiber sheets and providing a stack of said binderless glass fiber sheets in an amount sufficient to achieve insulation board of desired density less than 30 pounds per cubic foot;

(b) providing a press to compress the stack;

(c) heating the stack and the press to a temperature in the range of from the glass strain temperature to less than the glass softening temperature for a time period sufficient to achieve thermal equilibration of the stack and the press surface;

(d) thereafter compressing the stack by applying a light vertically compressive force of from 0.2 to 5.0 pounds per square inch to the stack with the press, at said thermal equilibrium for a time period sufficient to produce insulation board of desired density and to substantially relieve stress within the board; and (e) cooling the compressed glass fiber stack to ambient temperature.

12. The process of claims 10 or 11 wherein the density is from 14 to less than 30 pounds per cubic foot.

13. The process of claims 10 or 11 wherein step (c) is accomplished by heating the stack and the press together.

14. The process of claims 10 or 11 wherein a part of step (c) is accomplished by heating the stack and the press separately.

15. The process of claims 10 or 11 wherein the temperature range of step (c) is from 100° F. greater than the strain temperature to 200° F. below the glass softening temperature.

16. The process of claims 10 or 11 wherein the light vertically compressive force is from 0.5 to 1.5 pounds per square inch.

17. The process of claims 10 or 11 wherein the time period of step (d) is from 2 to 16 hours.

18. The process of claims 10 or 11 wherein the glass fiber sheets are comprised of glass fibers having a diameter of from 0.2 to 13 microns.

19. Insulation board essentially free of binder, capable of bearing a load and having a density less than 30 pounds per cubic foot comprised of compressed glass fibers oriented essentially in planes parallel to one another so as to have substantially only point contact between fibers.

* * * * *